US012519994B2

(12) United States Patent
Varadarajan et al.

(10) Patent No.: US 12,519,994 B2
(45) Date of Patent: *Jan. 6, 2026

(54) CONTEXT-AWARE CONTENT DELIVERY

(71) Applicant: Palo Alto Networks, Inc., Santa Clara, CA (US)

(72) Inventors: Subramanian Varadarajan, Los Gatos, CA (US); Rosarin Jolly Roy Antonyraj, Santa Clara, CA (US); Kumaravel Senthivel, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,642

(22) Filed: May 29, 2024

(65) Prior Publication Data

US 2024/0314376 A1 Sep. 19, 2024

Related U.S. Application Data

(63) Continuation of application No. 16/843,825, filed on Apr. 8, 2020, now Pat. No. 12,003,796.

(Continued)

(51) Int. Cl.
*H04N 21/239* (2011.01)
*H04N 21/2343* (2011.01)
(Continued)

(52) U.S. Cl.
CPC ..... *H04N 21/2393* (2013.01); *H04N 21/2343* (2013.01); *H04N 21/235* (2013.01);
(Continued)

(58) Field of Classification Search
CPC ........... H04N 21/2393; H04N 21/2343; H04N 21/235; H04N 21/2385; H04N 21/2387;
(Continued)

(56) References Cited

U.S. PATENT DOCUMENTS

2009/0135716 A1 5/2009 Veillette
2009/0210549 A1 8/2009 Hudson et al.
(Continued)

OTHER PUBLICATIONS

PCT Application No. PCT/US2020/027332, International Search Report mailed Jul. 13, 2020, 3 pages.
(Continued)

*Primary Examiner* — Adil Ocak
(74) *Attorney, Agent, or Firm* — Gilliam IP PLLC

(57) ABSTRACT

This present application relates to delivery of data content across a mesh network of proxy servers based on network context. In some embodiments, optimal paths for delivering the application or data content are computed and selected dynamically based upon context of network traffic. In some embodiments, large data content, such as video content, is segmented dynamically based on network context to reduce delay between a request for the video content by a client device and start of playback of the requested video content at the client device. In some embodiments, a server determines a segmentation profile for segmenting the video content into a plurality of video segments each having a segment size determined based on link performance metrics, generates a manifest file referencing the plurality of video segments in a temporal order and provide the manifest file to a client device.

20 Claims, 10 Drawing Sheets

Related U.S. Application Data

(60) Provisional application No. 62/831,150, filed on Apr. 8, 2019.

(51) Int. Cl.
*H04N 21/235* (2011.01)
*H04N 21/2385* (2011.01)
*H04N 21/2387* (2011.01)
*H04N 21/24* (2011.01)
*H04N 21/472* (2011.01)
*H04N 21/81* (2011.01)
*H04N 21/84* (2011.01)
*H04N 21/8545* (2011.01)

(52) U.S. Cl.
CPC ..... *H04N 21/2385* (2013.01); *H04N 21/2387* (2013.01); *H04N 21/2402* (2013.01); *H04N 21/47217* (2013.01); *H04N 21/8166* (2013.01); *H04N 21/84* (2013.01); *H04N 21/8545* (2013.01)

(58) Field of Classification Search
CPC ......... H04N 21/2402; H04N 21/47217; H04N 21/8166; H04N 21/84; H04N 21/8545; H04L 65/612; H04L 65/752; H04L 65/765; H04L 67/101; H04L 67/568; H04L 65/80
USPC ....................................................... 725/116
See application file for complete search history.

(56) References Cited

U.S. PATENT DOCUMENTS

| | | |
|---|---|---|
| 2014/0344410 A1 | 11/2014 | Saremi et al. |
| 2014/0369666 A1 | 12/2014 | Clevenger et al. |
| 2017/0262410 A1 | 9/2017 | Usui |
| 2018/0343192 A1* | 11/2018 | Antonyraj ........... H04L 67/1001 |
| 2019/0069038 A1 | 2/2019 | Phillips et al. |

OTHER PUBLICATIONS

PCT Application No. PCT/US2020/027332, Written Opinion of the International Searching Authority mailed Jul. 13, 2020, 6 pages.

* cited by examiner

CONTEXT-AWARE CONTENT DELIVERY

FIELD OF THE INVENTION

The various embodiments described in this document relate to content delivery in a mesh network. In particular, embodiments deliver video content across a mesh network of proxy servers by dynamically segmenting the video content based upon context of network conditions.

BACKGROUND

Content delivery networks (CDNs) aim to serve content to end-users with high availability and high performance. In particular, CDNs deploy proxy servers in multiple, geographically diverse data centers to cache and serve the content. When the content is requested, the request is directed to the node that, e.g., will require the fewest hops, is the least number of network seconds away from the client requesting the content, etc. Typically, this results in the selection of an edge node that is closest to the client. For example, a proxy server within a telecommunications service provider (TSP) network may cache and serve content to customers of the TSP to lessen demands on the network backbone and quickly and reliably deliver the content. Caching content in many locations to maximize the chances of having a proxy server close to any given client, however, can incur significant costs.

DESCRIPTION OF THE EMBODIMENTS

Figure 1:
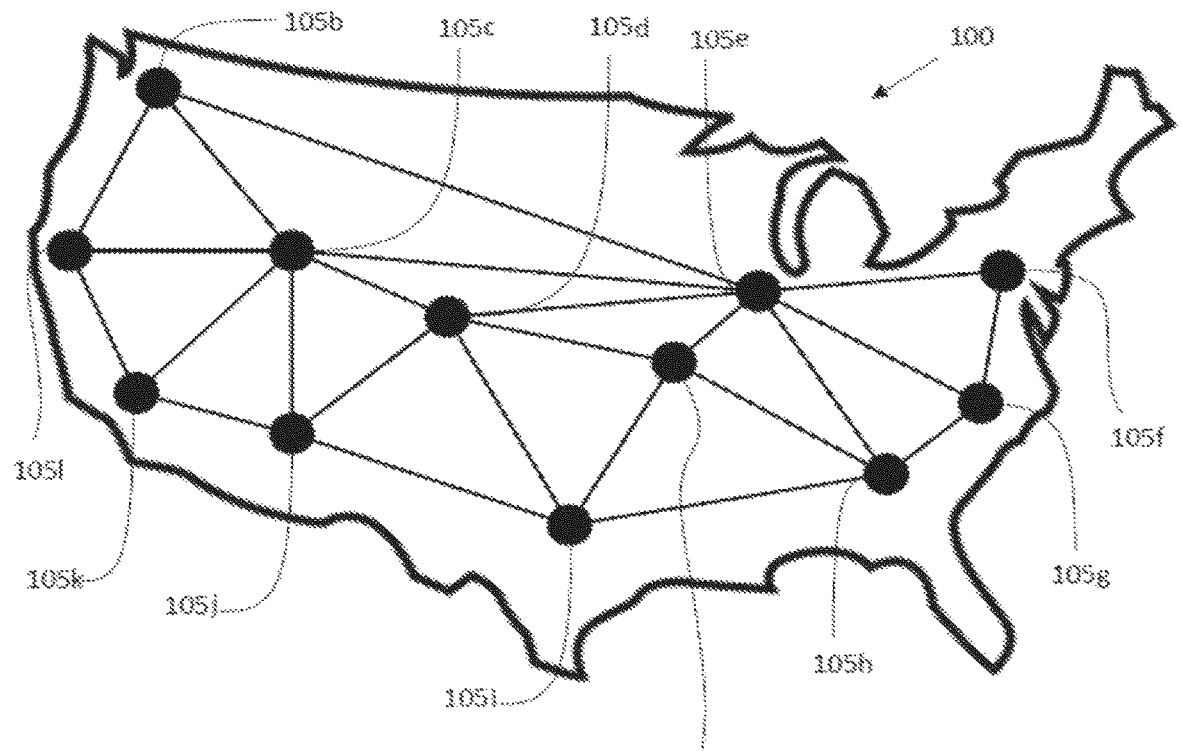
FIG. 1 is a block diagram of an exemplary mesh network of proxy server nodes implementing context-aware path computation according to some embodiments.
Figure 1:
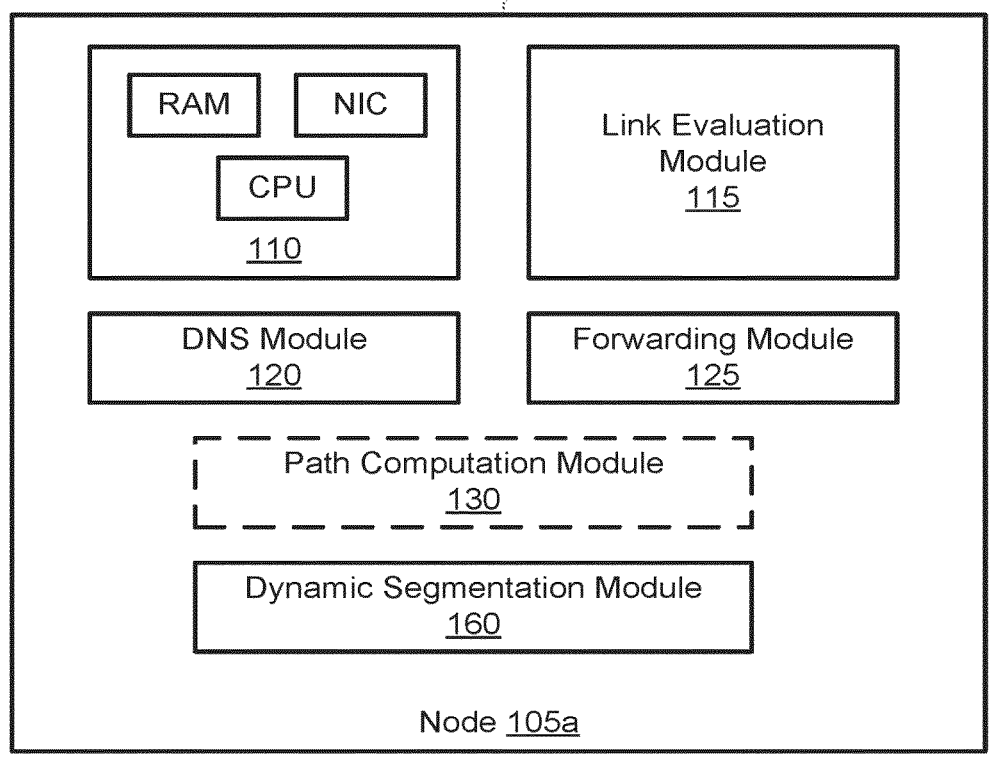

This present application relates to delivery of data content across a mesh network of proxy servers based on network context. In some embodiments, optimal paths for delivering the application or data content are computed and selected dynamically based upon context of network traffic. In some embodiments, large data content, such as video content, is segmented dynamically based on network context to reduce the delay between a request for the video content by a client device and start of playback of the requested video content at the client device.

A1. In some embodiments, a server for providing video content for playback by client device comprises one or more processors configured to:
receive, from a first application executing on a first client device, a first request to provide first video content for playback;
retrieve first link performance metrics of first network links for providing the first video content to the first client device;
determine a first segmentation profile for segmenting the first video content into a first plurality of video segments based on the first link performance metrics, the first plurality of video segments including first video segments each having a first segment size determined by the server based on the first link performance metrics;
generate a first manifest file referencing the first plurality of video segments in a first temporal order; and
provide the first manifest file to the first application in response to the first request, the first manifest file enabling the first application to obtain and playback at least part of the first video content.

A2. In some embodiments, in the server of A1, the one or more processors are further configured to:
receive, from a second application executing on a second client device, a second request to provide the first video content for playback;
retrieve second link performance metrics of second network links for providing the first video content to the second client device;
determine a second segmentation profile for segmenting the first video content into a second plurality of video segments based on the second link performance metrics, the second plurality of video segments including second video segments each having a second segment size that is distinct from the first segment size;
generate a second manifest file referencing the second plurality of video segments in a second temporal order; and
provide the second manifest file to the second application in response to the second request, the second manifest file enabling the second application to obtain and playback at least part of the first video content.

A3. In some embodiments, in the server of any of A1 and A2, the one or more processors are further configured to:
receive, from the first application executing on the first client device, a third request to provide a second video content for playback;
retrieve third link performance metrics of third network links for providing the second video content to the first client device;
determine a third segmentation profile for segmenting the second video content into a third plurality of video segments based on the third link performance metrics, the third plurality of video segments including third video segments each having a third segment size that is distinct from the first segment size;

generate a third manifest file referencing the third plurality of video segments in a third temporal order; and provide the third manifest file to the first application in response to the third request, the third manifest file enabling the first application to obtain and playback at least part of the second video content.

A4. In some embodiments, in the server of any of A1 to A3, the one or more processors are further configured to, for each respective video segment in the first plurality of video segments:

determine a respective segment size of the each respective video segment based on the first link performance metrics;

determine if a respective segment file corresponding to the each respective video segment is present in one or more storage devices accessible by the server; and generate the respective segment file in response to the determination that the respective segment file is not present in the one or more storage devices.

A5. In some embodiments, in the server of A4, the first manifest file includes a respective network location for the respective segment file corresponding to the each respective video segment in the first plurality of video segments.

A6. In some embodiments, in the server of A5, the first manifest file includes the respective segment size.

A7. In some embodiments, in the server of any of A1 to A6, the first plurality of video segments further include fourth video segments each having a fourth segment size that is distinct from the first segment size.

A8. In some embodiments, in the server of A7, the fourth video segments are to be played back by the client device subsequent to the first video segments, the fourth segment size being larger than the first segment size.

A9. In some embodiments, in the server of any of A2 to A8, the first segment size corresponds to a first playback duration and the second segment size corresponds to a second playback duration that is distinct from the first playback duration.

A10. In some embodiments, in the server of any of A2 to A8, the first segment size corresponds to a first image resolution and the second segment size corresponds to a second image resolution that is distinct from the first image resolution.

A11. In some embodiments, in the server of any of A1 to A10, the first link performance metrics include one or more of:

bytes transmitted per second and per connection through each respective node in the first links;

bytes received per second and per connection by the respective node;

requests per second per connection in the first links;

incoming packet loss per network address in the first links;

outgoing packet loss per network address in the first links;

latency per network address in the first links;

bandwidth per network address in the first links;

jitter per network address in the first links; and network utilization in the first links.

A12. In some embodiments, in the server of any of A1 to A11, the first link performance metrics include link performance metrics based on historical signals of past interactions between the client and the server, the historical signals including some or all of request cadence, re-transmission requests and performance information collected by the server.

A13. In some embodiments, in the server of any of A1 to A12, the one or more processors are further configured to:

determine a network path from the server to client; and determine the first links based in the network path.

A14. In some embodiments, in the server of any of A1 to A13, at least one of the link performance metrics is determined by the first client device and received by the server.

A15. In some embodiments, a method for providing video content for playback by client devices comprises:

at a server in a content delivery network:

receiving, from a first application executing on a first client device, a first request to provide first video content for playback;

retrieving first link performance metrics of first network links for providing the first video content to the first client device;

determining a first segmentation profile for segmenting the first video into a first plurality of video segments based on the first link performance metrics, the first plurality of video segments including first video segments each having a first segment size;

generating a first manifest file referencing the first plurality of video segments in a first temporal order; and providing the first manifest file to the first application in response to the first request, and the first manifest file enabling the first application to obtain and playback at least part of the first video content.

A16. In some embodiments, the method of A15 further comprises, at the server:

receiving, from a second application executing on a second client device, a second request to provide the first video content for playback;

retrieving second link performance metrics of second network links for providing the first video content to the second client device;

determining a second segmentation profile for segmenting the first video into a second plurality of video segments based on the second link performance metrics, the second plurality of video segments including second video segments each having a second segment size that is distinct from the first segment size;

generating a second manifest file referencing the second plurality of video segments in a second temporal order; and providing the second manifest file to the second application in response to the second request, the second manifest file enabling the second application to obtain and playback at least part of the first video content.

A17. In some embodiments, the method of any of A15 and A16 further comprises, at the server:

receiving, from the first application executing on the first client device, a third request to provide a second video content for playback;

retrieving third link performance metrics of third network links for providing the second video content to the first client device;

determining a third segmentation profile for segmenting the second video into a third plurality of video segments based on the third link performance metrics, the third plurality of video segments including third video segments each having a third segment size that is distinct from the first segment size;

generating a third manifest file referencing the third plurality of video segments in a third temporal order; and providing the third manifest file to the first application in response to the third request, the third manifest file enabling the first application to obtain and playback at least part of the second video content.

A18. In some embodiments, the method of any of A15 to A17 further comprises, for each respective video segment in the first plurality of video segments:

determining a respective segment size of the each respective video segment based on the first link performance metrics;

determining if a respective segment file corresponding to the each respective video segment is present in one or more storage devices accessible by the server; and generating the respective segment file in response to the determination that the respective segment file is not present in the one or more storage devices.

A19. In some embodiments, in the method of A18, the first manifest file includes a respective network location for the respective segment file corresponding to the each respective video segment in the first plurality of video segments.

A20. In some embodiments, in the method of A19, the first manifest file includes the respective segment size.

A21. In some embodiments, in the method of any of A15 to A20, the first plurality of video segments further include fourth video segments each having a fourth segment size that is distinct from the first segment size.

A22. In some embodiments, in the method of A21, the fourth video segments are to be played back by the client device subsequent to the first video segments, the fourth segment size being longer than the first segment size.

A23. In some embodiments, in the method of any of A16 to A22, the first segment size corresponds to a first playback duration and the second segment size corresponds to a second playback duration that is distinct from the first playback duration.

A24. In some embodiments, in the method of any of A16 to A22, the first segment size corresponds to a first image resolution and the second segment size corresponds to a second image resolution that is distinct from the first image resolution.

A25. In some embodiments, in the method of any of A15 to A24, the first link performance metrics include one or more of:

bytes transmitted per second and per connection through each respective node in the first links;

bytes received per second and per connection by the respective node;

requests per second per connection in the first links;

incoming packet loss per network address in the first links;

outgoing packet loss per network address in the first links;

latency per network address in the first links;

bandwidth per network address in the first links;

jitter per network address in the first links; and network utilization in the first links.

A26. In some embodiments, in the method of any of A15 to A25, the first link performance metrics include link performance metrics based on historical signals of past interactions between the client and the server, the historical signals including some or all of request cadence, re-transmission requests and performance information collected by the server.

A27. In some embodiments, the method of any of A15 to A25 further comprises:

determining a network path from the server to client; and determining the first links based on the network path.

A28. In some embodiments, in the method of any of A16 to A26, at least one of the link performance metrics is determined by the first client device, the method further comprising receiving the at least one of the link performance metrics from the first client device.

A29. In some embodiments, a server for providing video content for playback by client devices comprises:

a processor configured to:

receive, from a first application executing on a first client device, a first request to provide first video content for playback, and to receive, from a second application executing on a second client device, a second request to provide the first video content for playback;

retrieve first link performance metrics of first network links for providing the first video content to the first client device, and retrieve second link performance metrics of second network links for providing the first video content to the second client device;

determine a first segmentation profile for segmenting the first video into a first plurality of content video segments based on the first link performance metrics, and determine a second segmentation profile for segmenting the first video into a second plurality of content video segments based on the second link performance metrics, the first plurality of content video segments including first content video segments each having a first segment size, the second plurality of content video segments including second content video segments each having a second segment size that is distinct from the first segment size;

generate a first manifest file referencing the first plurality of content video segments in a first temporal order, and generate a second manifest file referencing the second plurality of content video segments in a second temporal order; and provide the first manifest file to the first application in response to the first request, and provide the second manifest file to the second application in response to the second request, the first manifest file enabling the first application to obtain and playback at least part of the first video content, the second manifest file enabling the second application to obtain and playback at least part of the second video content.

A30. In some embodiments, a server for providing video content for playback by client devices comprises:

a processor configured to:

receive, from a first application executing on a first client device, a first request to provide first video content for playback and a second request to provide second video content for playback;

retrieve first link performance metrics of first network links for providing the first video content to the first client device, and retrieve second link performance metrics of second network links for providing the second video content to the second client device;

determine a first segmentation profile for segmenting the first video into a first plurality of content video segments based on the first link performance metrics, and determine a second segmentation profile for segmenting the second video content into a second plurality of content video segments based on the second link performance metrics, the first plurality of content video segments including first content video segments each having a first segment size, the second plurality of content video segments including second content video segments each having a second segment size that is distinct from the first segment size;

generate a first manifest file referencing the first plurality of content video segments in a first temporal order, and generate a second manifest file referencing the second plurality of content video segments in a second temporal order; and provide the first manifest file to the first application in response to the first request, and provide the second manifest file to the first application in response to the second request, the first manifest file enabling the first application to obtain and playback at least part of the first video content, the second manifest file enabling the first application to obtain and playback at least part of the second video content.

In some embodiments, optimal paths are selected by a path management hub using link performance metrics received from proxy server nodes that make up the mesh network and based upon a service-based context. The path management hub can be implemented as a single server or distributed system in a location or across multiple locations. Each service-based context represents one or more link performance metric types to be given preference for that service. In some embodiments, an administrator for the service provides a selection of a particular context. In some embodiments, the hub sets the context to a default setting or based upon an evaluation of traffic flow patterns for the service. As an example of selecting optimal paths, the path management hub may calculate directed graphs using various performance metrics of links along potential paths through the mesh network and select multiple paths as optimal based upon each service-based context. The path management hub maps the context-based optimal paths to the corresponding service.

Once optimal paths are selected and mapped, the path management hub distributes next hop information to the nodes. In some embodiments, a node receiving traffic for a given service uses the mapping to select a next hop provided by the path management hub and forward the traffic to that next hop. In some embodiments, one or more nodes track link performance metrics to report back to the path management hub. In some embodiments, nodes use the tracked link performance metrics to select among multiple next hops mapped to a single service.

As a result, embodiments reduce the number of locations needed to cache content or host applications in order to provide high performance. Instead, embodiments achieve high performance in delivering application or data content using intelligent selection of paths through the mesh of proxy servers. Additionally, embodiments utilize out-of-band path selection based upon a hub's global view of the mesh network as well as in-band selection based upon an individual node's evaluation of performance metrics.

In some embodiment, once a network path for delivering requested video content is selected or determined, link performance metrics associated with the network path are obtained or determined, and the requested video content is segmented dynamically based on the link performance metrics. In some embodiments, a video file, such as a movie, is divided into a series of sequentially organized data segments, each respective data segment having a respective segment size that corresponds to a playback duration and/or an image resolution for the respective data segment. The respective segment size is dynamically determined in response to the request for the video content and based on the link performance metrics.

FIG. 1 illustrates, in block diagram form, exemplary mesh network 100 of proxy server nodes 105 (e.g., nodes 105a, 105b, 105c, 105d, 105e, 105f, 105g, 105h, 105i, 105j, 105k, and 105l) implementing context-aware path computation. In some embodiments, mesh network 100 is a content delivery network (CDN) and/or application delivery network (ADN). Mesh network 100 includes a geographically distributed set of proxy server nodes 105 deployed in multiple data centers. Mesh network 100 may include more or fewer nodes 105 than illustrated.

In some embodiments, a respective node 105 (e.g., as illustrated by node 105a) includes hardware 110. Hardware 110 includes one or more processors ("CPU(s)"), data storage and memory (e.g., "RAM"), and network interface controllers ("NIC(s)"). The data storage and memory may be used for storing data, metadata, and programs (e.g., link evaluation module 115, DNS module 120, forwarding module 125, and/or path computation module 130) for execution by the processor(s). In some embodiments, the data storage and memory may include one or more of volatile and non-volatile memories, such as Random Access Memory ("RAM"), Read Only Memory ("ROM"), a solid state disk ("SSD"), Flash, Phase Change Memory ("PCM"), and/or other types of data storage, such as magnetic disk drives, optical disk drives, etc. In some embodiments, the memory includes internal and/or distributed memory. In some embodiments, one or more buses (not shown) interconnect the various components of hardware 110. In some embodiments, NIC(s) connect one more of nodes 105 (e.g., nodes 105a-105l), via a wired and/or wireless network, with other nodes 105, client devices external to mesh network 100, and/or server devices external to mesh network 100.

In some embodiments, a respective node (e.g., as illustrated by node 105a) includes multiple modules. Each of these modules may be embodied in hardware, software, or a combination of hardware and software. Link evaluation module 115 tracks metrics between nodes 105 (e.g., nodes 105a-105l). For example, link evaluation module 115 of a first node may track bytes transmitted through the first node to a service per second per connection and bytes received by the first node from a service per second per connection. In some embodiments, these metrics provide a representation of the data flow characteristics during a connection between a client and the service. Exemplary data flow characteristics are described in further detail with reference to FIGS. 3-6. In some embodiments, link evaluation module 115 tracks other metric types, including one or more of requests per second per connection, incoming packet loss per network address, outgoing packet loss per network address, latency per network address, bandwidth per network address, jitter per network address, network utilization, traffic content (e.g., by inspecting a header, packet, or other data/metadata in transit), latency of various requests and/or responses (e.g., requests and/or responses for HTML pages, JavaScript, CSS, images, APIs and/or media), etc.

Link evaluation module 115 stores tracked metrics in data storage or memory within hardware 110. Additionally, link evaluation module 115 transmits the tracked metrics to a path management hub using NIC(s) within hardware 110. In some embodiments, link evaluation module 115 maps one or metrics to a service for the corresponding traffic. For example, link evaluation module 115 may maintain a data structure within the data storage or memory that maps an identifier for a service to metrics for traffic coming from and/or going to the service. Exemplary services include providing content for a website, streaming video, providing data for an application, etc.

In some embodiments, link evaluation module 115 injects test traffic to track metrics between a first respective node 105 (e.g., node 105a) and each of a plurality of second nodes 105 (e.g., nodes 105b-105l). For example, each respective node 105 may store a list of network addresses of other nodes 105 and data for test transmissions. Transmitting test traffic to and receiving responses from other nodes 105 enables link evaluation module 115 to track metrics for links to other nodes 105 in addition to or instead of tracking actual traffic directed to and received from one or more services.

In some embodiments, link evaluation module 115 uses the tracked link performance metrics to select a next hop for traffic, e.g., as described in greater detail with reference to FIGS. 2-6.

In some embodiments, a respective node 105 (e.g., as illustrated by node 105a) includes domain name system (DNS) module 120. DNS module 120 stores next hop information. For example, respective nodes 105 may determine respective neighboring nodes 105 and track the next hop for traffic using an address discovery protocol. In some embodiments, next hop information is provided by a path management hub. For example, as described in greater detail herein, a path management hub may determine optimal paths per service and distribute next hop information to nodes 105 for those paths. Next hop information for a service may include a list of optimal next hops mapped to the service in ranked order. In some embodiments, link evaluation module 115 adjusts the ranked order of next hops based upon the tracked link performance metrics, e.g., as described in greater detail with reference to FIGS. 2-6.

In some embodiments, a respective node 105 (e.g., as illustrated by node 105a) includes forwarding module 125. Forwarding module 125 receives traffic from a client, service, or another node 105, determines a service and/or destination from the received traffic, and/or selects the next hop using the mapping stored by DNS module 120.

In some embodiments, a node 105 (e.g., node 105a) includes path computation module 130. In some embodiments, a node that includes path computation module 130 serves as a path management hub for mesh network 100. For example, mesh network 100 may have one active path management hub that computes and distributes optimal paths to nodes 105.

In some embodiments, path computation module 130 maintains a registry of nodes 105 within mesh network 100. In some embodiments, path computation module 130 receives link performance metrics from each of nodes 105 and determines optimal paths between nodes 105 for each of a plurality of metric types or a combination of metric types using the received link performance metrics. In some embodiments, path computation module 130 maps a service identifier to a plurality of the determined optimal paths for a context representing one or more link performance metric types and transmits a next hop for each of the plurality of mapped optimal paths, along with the mapping of the service(s) to the next hops, to one or more nodes. In some embodiments, path computation module 130 maps a context or link performance metric type to one or more of the next hops and transmits that mapping to one or more nodes. Path computation module 130, as implemented within a path management hub, is described in greater detail with reference to FIGS. 2-6.

In some embodiments, a node 105 (e.g., node 105a) includes one or more dynamic segmentation modules 160 configured to segment large content (e.g., video content) requested by client devices based on the link performance metrics associated with one or more network paths for delivering the content, as described below in greater detail with reference to FIGS. 7 to 10C.

Figure 2:
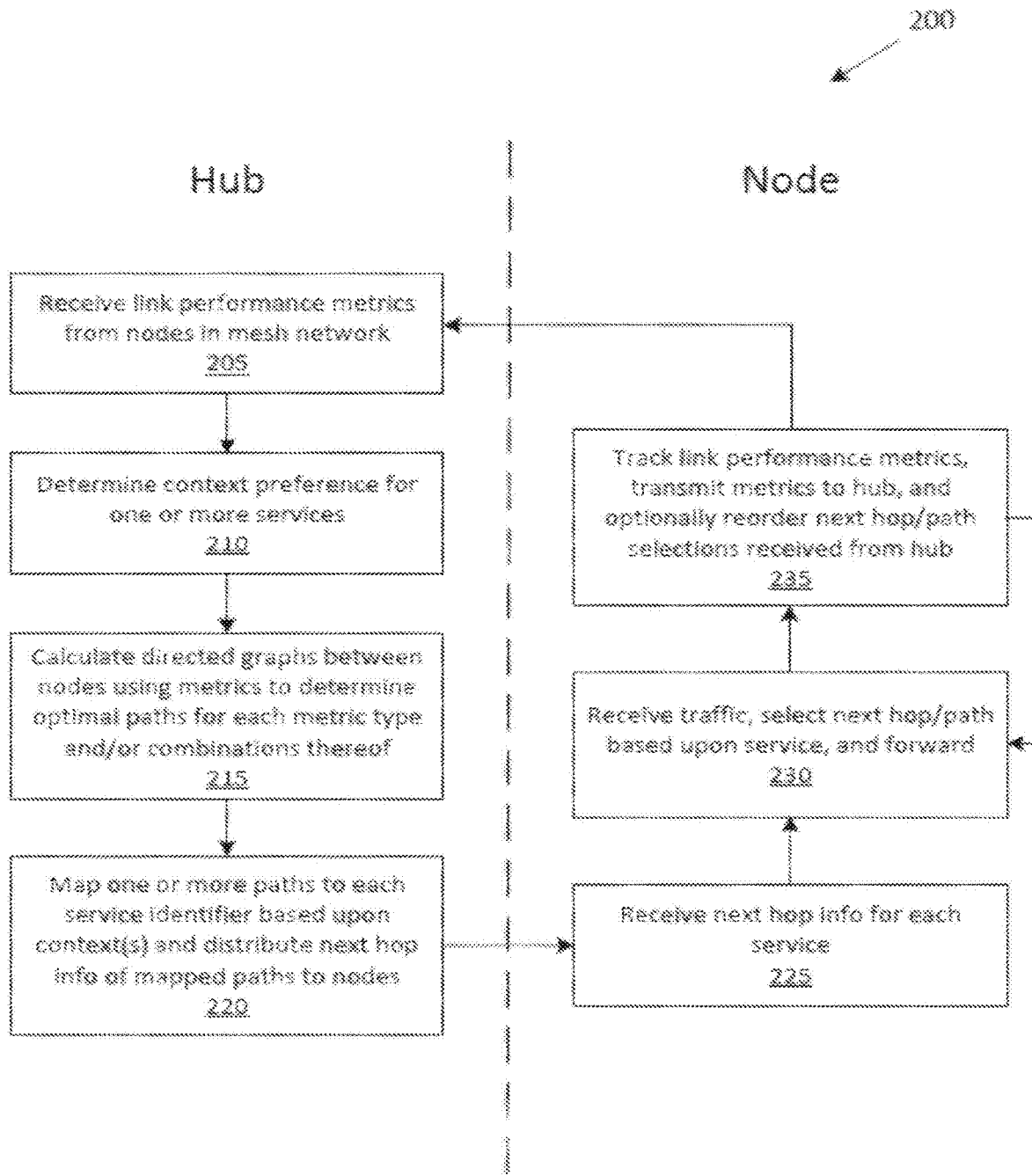
FIG. 2 is a flowchart illustrating a method of context-aware path computation and selection according to some embodiments.

FIG. 2 is a flow chart illustrating exemplary method 200 of context-aware path computation and selection. At block 205, the path management hub receives link performance metric data from nodes 105 within mesh network 100. For example, mesh network 100 is illustrated as including twelve nodes 105a-105l, one of which (e.g., node 105a) serves as path management hub via the active use of path computation module 130. Each link evaluation module 115 of each respective node 105 tracks and transmits link performance metrics for actual and/or test traffic transmitted and/or received by that respective node 105 and transmits the link performance metrics to the path management hub. In some embodiments, the path management hub receives the link performance metrics at a regular interval for each node 105 (e.g., as defined by periods of time, number of connections evaluated, etc.). The path management hub receives the link performance metrics, e.g., via a client/server communication(s) with each respective node 105 and/or via a message queue. Received link performance metrics include one or more of: bytes transmitted through the node to a service per second per connection, bytes received by the node from a service per second per connection, an indication of a type of data flow during a connection between a client and the service as represented by the bytes transmitted/received, requests per second per connection, incoming packet loss per network address, outgoing packet loss per network address, latency per network address, bandwidth per network address, jitter per network address, network utilization, traffic content type (e.g., by inspecting a header, packet, or other data/metadata in transit), context/link performance metric type for a service as determined by a respective node 105, etc. In some embodiments, the link performance metrics are mapped to one or more of: a service, a period of time, a source address or other identifier, and a destination address or other identifier.

At block 210, the path management hub determines a context representing one or more link performance metric types for each service utilizing mesh network 100. In some embodiments, a context indicates that traffic to and/or from a service is bandwidth sensitive. In such embodiments, the path management hub will prioritize paths through mesh network 100 that provide the best performance for bandwidth. In some embodiments, a context may indicate that traffic to and/or from a service is latency sensitive. In such embodiments, the path management hub will prioritize paths through mesh network 100 that provide the best performance for latency. A context may represent multiple link performance metric types. For example, a context may indicate that traffic to and/or from a service is latency and cost sensitive. In such an example, the path management hub will prioritize paths through mesh network 100 that provide the best performance for latency while also being cost effective and/or not exceeding a cost threshold. Contexts are not limited to these examples and may represent another link performance metric type or a combination of link performance metric types.

The path management hub determines a context for a service by looking up a stored mapping between the service and the context or otherwise making a determination based upon data received from nodes 105. For example, the path management hub may receive and store a preferred context from an administrator or other representative of the service seeking to have content or application delivered via mesh network 100. Alternatively, the path management hub may receive and store a preferred context as determined by a node 105. As another alternative, the path management hub's determination includes determining that there is no preconfigured context and setting the context to a default setting.

In some embodiments, the path management hub determines context based upon a node 105, identifying a traffic type by parsing the traffic header/metadata and/or traffic payload data and transmitting the traffic type to the path management hub. For example, the path management hub may receive from a node 105 a mapping between an identifier for a service and a traffic type for that service as determined by the node 105. Traffic types may label the content, e.g., image, audio, video, application programming interface (API) requests and/or responses, voice over internet protocol (VOIP) calls, etc. Alternatively, traffic types received from nodes 105 may categorize the traffic. For example, a node 105 may categorize images and API requests and/or responses as latency sensitive traffic, streaming video as bandwidth sensitive, VOIP calls as jitter sensitive, etc.

In some embodiments, the path management hub determines context based upon data flow patterns detected by a node 105. For example, nodes 105 may track data flow, e.g., as described with reference to FIGS. 3-6, and transmit to the path management hub a mapping between an identifier for a service and a traffic type based upon the tracked data flow. For example, a node 105 may categorize traffic flows as latency sensitive traffic, bandwidth sensitive, jitter sensitive, etc. based upon bytes transmitted through the node to a service per second per connection, bytes received by the node from a service per second per connection, incoming packet volume, outgoing packet volume, symmetry between incoming and outgoing traffic, etc.

At block 215, the path management hub calculates or otherwise determines one or more optimal paths for each link performance metric type. For example, in response to receiving the link performance metrics, the path management hub utilizes the received link performance metrics to assign values to each link between two nodes 105 within mesh network 100. For each link performance metric type, the path management hub calculates directed graphs between nodes 105 using the values for that performance metric type as inputs to Dijkstra's algorithm or another algorithm for determining the shortest path between nodes 105.

In some embodiments, the path management hub determines one or more optimal paths for a combination of link performance metric types. For example, the path management hub may utilize multiple link performance metric types to assign values to each link between two nodes 105. In some embodiments, utilizing multiple performance metric types includes creating a multidimensional value in which each dimension represents a performance metric type. In some embodiments, utilizing multiple performance metric types includes calculating a sum, product, or other combination of the performance metrics of each type for each link. In some embodiments, utilizing multiple performance metric types includes calculating a shortest path for a first performance metric type that does not exceed or does not fall below a threshold for a second performance metric type.

In some embodiments, assigning values to each link includes normalizing the received link performance metrics. Normalizing the received link performance metrics may include adjusting values based upon whether a high value or a low value is optimal for a given link performance metric type. For example, the shortest path for latency is based upon links with low latency while the shortest path for bandwidth is based upon links with high bandwidth. Additionally, normalizing the received link performance metrics may include weighting link performance metrics based upon link performance metric type.

In some embodiments, in determining optimal paths, the path management ranks multiple paths between nodes 105 for each link performance metric type. For example, the path management hub may determine the top two or three optimal paths between two nodes 105. If a service may be provided by multiple nodes 105 (e.g., using cached content at each of multiple nodes 105 or each of multiple nodes 105 may serve as a point of ingress/egress for an origin of a given service), the path management hub may determine the top two or three optimal paths between a first node 105 and one of the multiple other nodes. Alternatively, the path management hub determines a single optimal path between each set of two nodes 105.

At block 220, the path management hub maps a service identifier for each service to one or more of the optimal paths based upon the determined context for that service. For example, if the determined context for a service indicates a preference for high bandwidth paths, the path management hub maps an identifier for that service to the path(s) determined to be optimal for bandwidth. In an embodiment in which multiple optimal paths are determined for a context, the path management hub maps the identifier to a ranked list of the optimal paths. A service identifier is a port number, network address, combination of port number and network address, or another unique identifier for a service.

In some embodiments, the path management hub utilizes a context to map a service identifier to multiple optimal paths, each path selected as being optimal for a different link performance metric type. For example, a default context may be utilized to map a service identifier to a list including an optimal path for bandwidth, an optimal path for latency, and an optimal path for jitter. Using a determined traffic type (e.g., based upon traffic flow or inspection, as described herein), nodes 105 may select an optimal path that corresponds to the traffic type. For example, for a traffic type that is bandwidth sensitive, node 105 selects the optimal path for bandwidth.

Additionally, the path management hub distributes next hop information of the mapped optimal paths to nodes 105. For example, optimal paths may include intermediate nodes 105 between a first node 105 forwarding traffic and a second node 105 receiving the traffic. The path management hub determines the next hop along each optimal path for each node 105 for each service and transmits a mapping of a service identifier to one or more next hops for the context determined to apply to that service. In some embodiments, the path management hub includes a mapping of a context or link performance metric type the next hops when distributed to nodes 105.

At block 225, each node 105 receives next hop information from the path management hub. For example, for each service, a first node 105 receives an identifier for the service mapped to a ranked list of next hops representing other nodes 105 to which the first node is to forward traffic for the service. In some embodiments, the ranked list is mapped to both a service and a context. In some embodiments, the ranked list is mapped to a service and each next hop within the ranked list is mapped to a context. DNS module 120 stores the mapped ranked list.

At block 230, node 105 receives network traffic and forwards the traffic using the received next hop information. For example, forwarding module 125 receives network traffic that includes a domain, source address, destination address, port number, a combination of an address and port number, and/or another unique identifier associated with a service. Using the service identifier, DNS module 120 selects a next hop. In an embodiment in which node 105 receives a ranked list of next hops mapped to a service identifier, DNS module 120 selects the top ranked next hop in the list and forwarding module 125 forwards the traffic to the node 105 at the next hop.

At block 235, node 105 tracks link performance metrics. In some embodiments, link evaluation module 115 injects test traffic to track metrics between a first node 105 and each of a plurality of second nodes 105. For example, each node 105 may store a list of network addresses of other nodes 105 and data for test transmissions. In some embodiments, the stored list of network addresses is the collection of next hops received from the path management hub. Transmitting test traffic to and receiving responses from other nodes 105 enables link evaluation module 115 to track metrics (e.g., one or more of the plurality of link performance metric types described in this document) for links to other nodes 105 in addition to or instead of tracking actual traffic directed to and received from one or more services. In some embodiments, link evaluation module 115 transmits and receives test traffic via forwarding module 125 in response to the expiration of a regular time interval, the completion of a threshold number of connections, or at another interval/threshold.

Node 105 transmits tracked link performance metrics to the path management hub. In some embodiments, link evaluation module 115 transmits tracked link performance metrics to the path management hub upon completion of evaluation a batch of links. In some embodiments, link evaluation module 115 transmits tracked link performance metrics as determined.

Link evaluation module 115 optionally reorders next hop information stored by DNS module 120 based upon tracked link performance metrics. As a result of such a reordering, node 105 makes internal/in-band adjustments to the optimal paths in between external/out-of-band adjustments to the optimal paths made by the path management hub. For example, link evaluation module 115 may determine, using the tracked link performance metrics, that the top ranked next hop as determined by the path management hub is no longer the optimal path for a given context. As a specific example, the next hop info received by node 105 indicates that a service is mapped to a context configured to prioritized bandwidth and three next hops based upon the context. In response to link evaluation module 115 determining that tracked link performance metrics demonstrate that the second next hop in the ranked list outperforms the first next hop in the ranked list in bandwidth, link evaluation module reorders the ranked list to promote the second next hop to first.

In some embodiments, link evaluation module 115 makes the determination to reorder the ranked list of next hops for a service by determining which link performance metric(s) to use to evaluate a ranked list of next hops for a given service. For example, a context identifier received from the path management hub along with the service and mapped next hops for the service may be resolved by link evaluation module 115 as representing one or more link performance metrics.

In some embodiments, link evaluation module 115 makes the determination to reorder the ranked list of next hops for a service by inspecting traffic for that service. For example, by inspecting a header, packet, or other data/metadata in transit, link evaluation module 115 determines a traffic type for that service. Traffic types may label the content, e.g., image, audio, video, application programming interface (API) requests and/or responses, voice over internet protocol (VOIP) calls, etc. and/or map the traffic type to a context/link performance metric type. Link evaluation module 115 reorders the ranked list of next hops if any lower ranked next hop outperforms a higher ranked next hop in the tracked link performance metric of the determined link performance metric type for the traffic.

In some embodiments, the ranked list may include next hops that prioritize different contexts or link performance metric types. In such an embodiment, link evaluation module 115 reorders the ranked list of next hops if any lower ranked next hop prioritizes the determined link performance metric type for the traffic and the top ranked next hop does not.

In some embodiments, link evaluation module 115 makes the determination to reorder the ranked list of next hops for a service based upon estimating the load upon a link, node 105, or service. For example, a service may be provided by multiple origin servers coupled to different nodes 105 or by different nodes 105 as proxies. The tracked link performance metrics may provide an indication of a path, node 105, or origin that is less loaded and/or a path, node 105, or origin that has exceeded a threshold load value. In response to determining there is a less loaded option or in response to determining the top ranked next hop is an option that exceeds a load threshold, link evaluation module 115 reorders the ranked list to provide load balancing, throttle traffic, etc.

In some embodiments, link evaluation module 115 makes the determination to reorder the ranked list of next hops for a service by characterizing traffic flow data for the service. For example, traffic flows may be characterized as corresponding to a context or one or more link performance metric types. The context or link performance metric type(s) may be used to evaluate the link performance metrics and reorder next hops as described above.

Method 200 continues, in parallel, to block 205 and block 230. The path management hub receives updated link performance metrics from nodes 105 and updates optimal paths and the corresponding next hop information as described with reference to blocks 205 through 220. Additionally, in the meantime, the node 105 continues to receive and forward traffic, track link performance metrics, and optionally reorder next hops as described with reference to blocks 230 and 235.

FIGS. 3-6 illustrate exemplary traffic flows used to determine a context representing one or more link performance metric types to be given preference for a service. For example, link evaluation module 115 may track as a part of the link performance metrics, per connection, bytes transmitted per second through the node to a service and/or bytes received per second by the node from a service. Link evaluation module 115 may perform determinations as described with regard to FIGS. 3-6 to determine whether next hop reordering criteria and/or context adjustment criteria are met.

Figure 3:
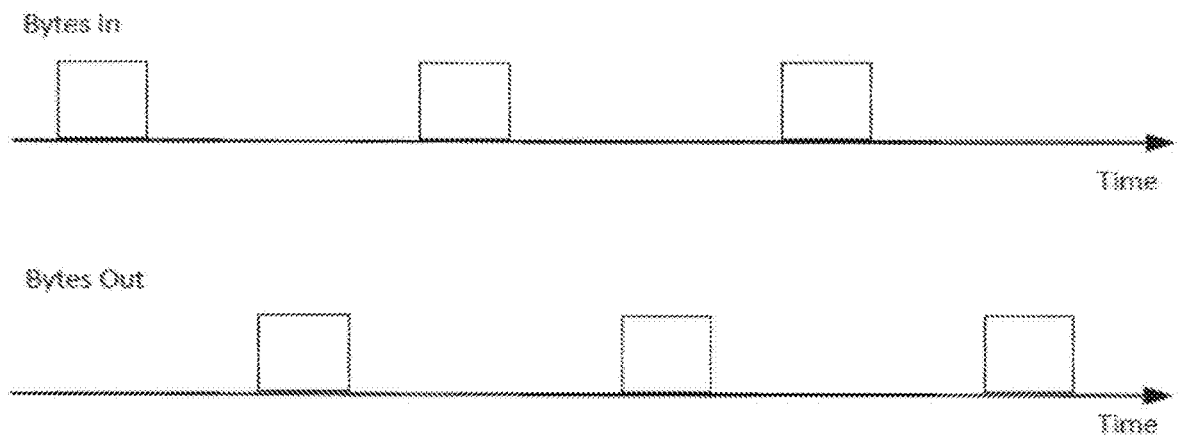
FIG. 3 includes timing diagrams illustrating an exemplary traffic flow for request(s) and response(s) for files according to some embodiments.

FIG. 3 illustrates an exemplary traffic flow for request(s) and response(s) for files. For example, a service may provide one or more Cascading Style Sheets (CSS), JavaScript, HyperText Markup Language (HTML) files, images, or other files. As illustrated, the traffic flow for requests and responses for such files may result in relatively small amounts of bytes per second in and out. Additionally, the illustrated traffic flow of such files demonstrates a relatively equal ratio of bytes in as compared to bytes out. Using the volume and/or ratio of bytes in and out, link evaluation module 115 determines that the next hop for the traffic should prioritize latency. For example, link evaluation module 115 determines that the volume of bytes in and/or volume of bytes out (and/or ratio of bytes in to bytes out) meets reordering criteria (e.g., a volume of byes out is below a threshold value and/or a ratio of bytes in to bytes out is within a predefined range of ratio values) and, thus, maps to a context that prioritizes latency.

Figure 4:
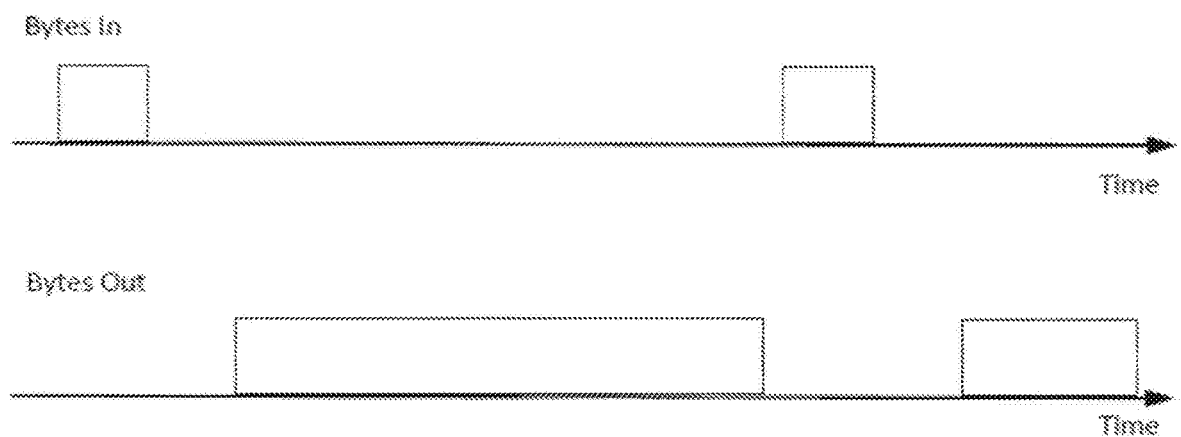
FIG. 4 includes timing diagrams illustrating an exemplary traffic flow for request(s) and response(s) for a streaming service according to some embodiments.

FIG. 4 illustrates an exemplary traffic flow for request(s) and response(s) for a streaming service. The illustrated traffic flow shows relatively small amounts of bytes per second in and larger amounts of bytes per second out. Using the volume of bytes out and/or ratio of bytes per second in to bytes per second out, link evaluation module 115 determines that the next hop for the traffic should prioritize bandwidth. For example, link evaluation module 115 determines that reordering criteria are met when, for example, the volume of bytes out is above a threshold value and/or a ratio of bytes in to bytes out (e.g., over a predetermined time period) is below a threshold ratio and, thus, maps to a context that prioritizes bandwidth.

Figure 5:
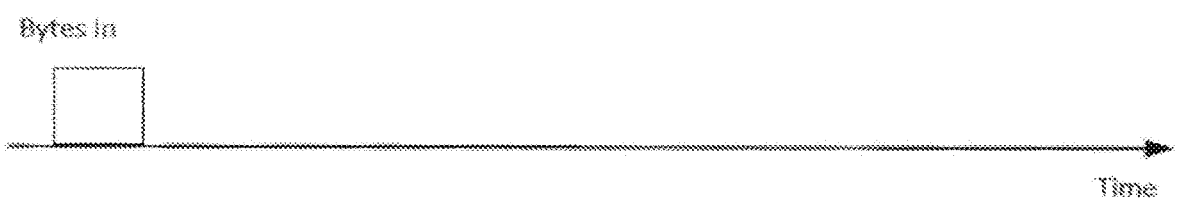
FIG. 5 includes timing diagrams illustrating an exemplary traffic flow for request(s) and response(s) for a streaming service that transmits data in a chunked manner according to some embodiments.
Figure 5:
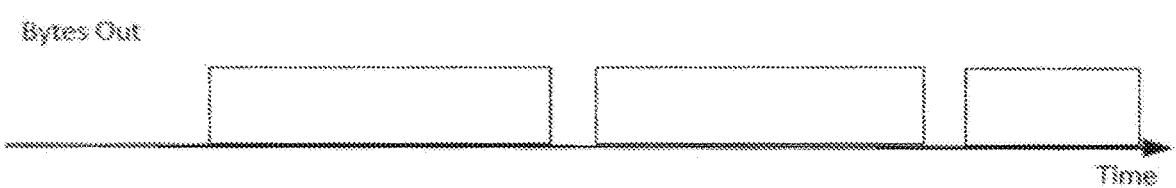

FIG. 5 illustrates an exemplary traffic flow for request(s) and response(s) for a streaming service that transmits data in a chunked manner. Similar to FIG. 4, the illustrated traffic flow shows relatively small amounts of bytes per second in and larger amounts of bytes per second out. Using the volume and/or ratio of bytes in and out, link evaluation module 115 determines that the next hop for the traffic should prioritize bandwidth. For example, link evaluation module 115 determines that reordering criteria are met when, for example, the volume of bytes out is above a threshold value and/or a ratio of volume of bytes in to bytes out (e.g., over a predetermined time period) is below a threshold ratio and, thus, maps to a context that prioritizes bandwidth.

Figure 6:
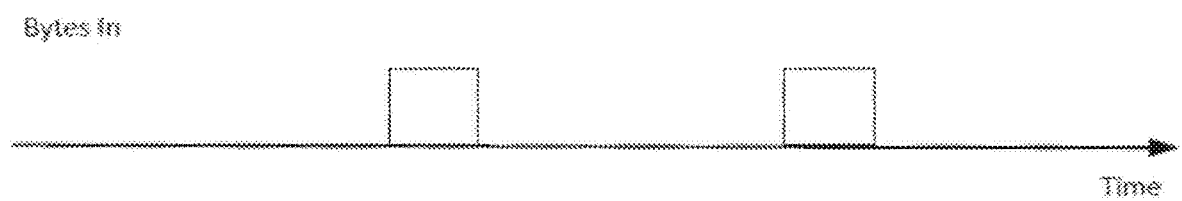
FIG. 6 includes timing diagrams illustrating an exemplary traffic flow for request(s) and response(s) for a frame-based protocol according to some embodiments.
Figure 6:
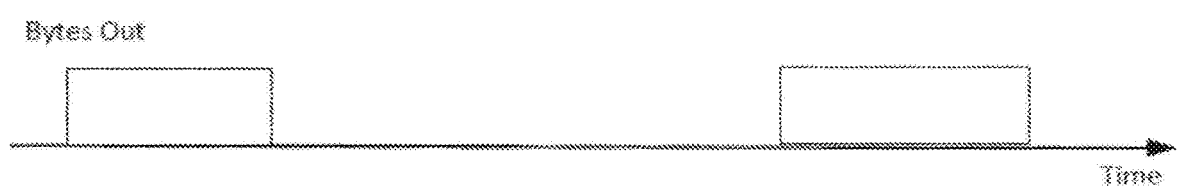

FIG. 6 illustrates an exemplary traffic flow for request(s) and response(s) for a frame-based protocol. For example, for the HTTP/2 protocol, it is possible that the server starts sending data as soon as the client connects and before a request or other bytes are sent by the client.

Figure 7:
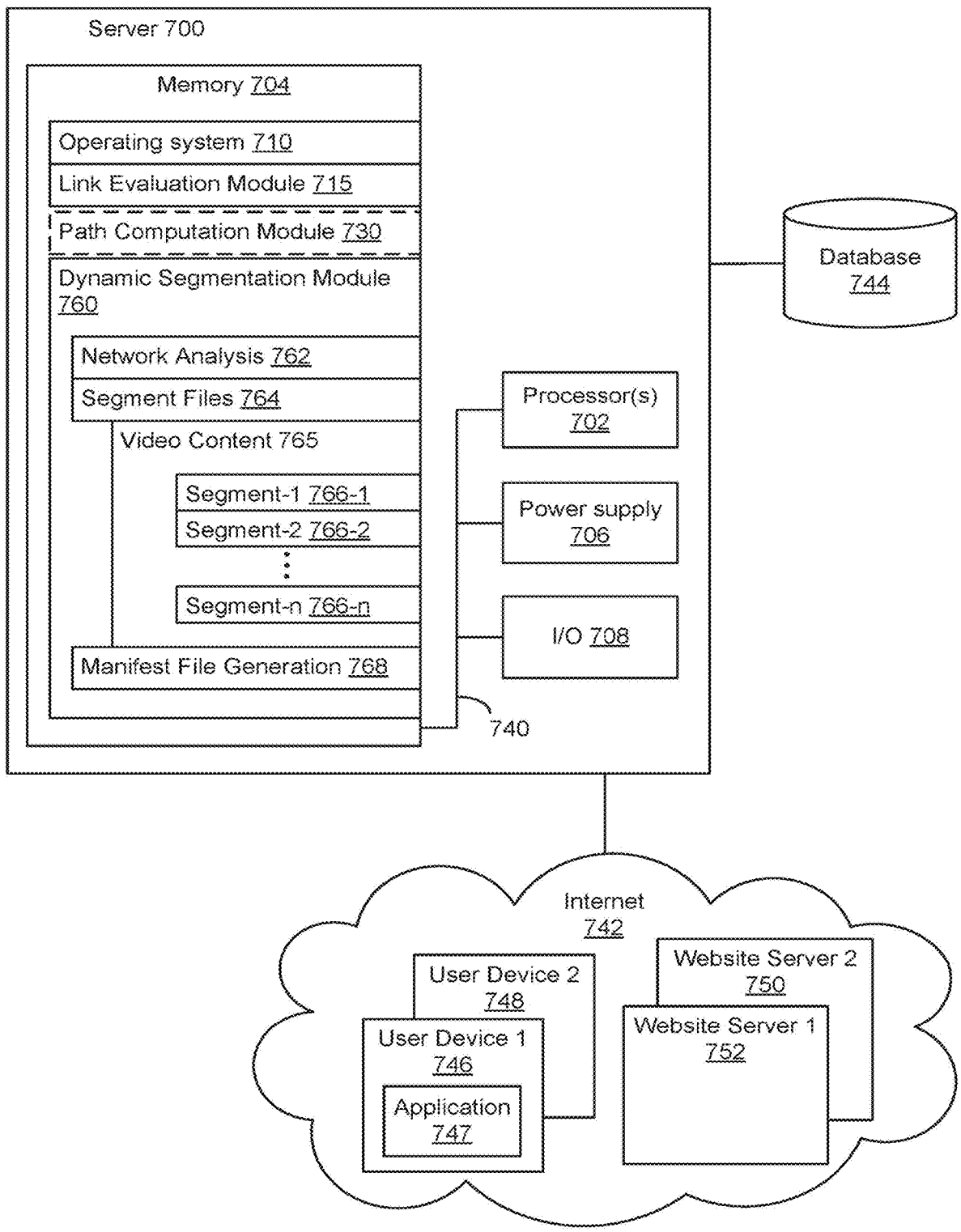
FIG. 7 is a block diagram of a server in a node according to some embodiments.

In some embodiments, each node 105 in mesh network 100 includes one or more proxy servers for processing client requests for application and content data. FIG. 7 is a system diagram of server 700 in a node 105 (e.g., node 105a), in accordance with some embodiments. Server 700 typically includes one or more processor(s) 702, a memory 704, a power supply 706, an input/output (I/O) subsystem 708, and a communication bus 740 for interconnecting these components.

Processor(s) 702 execute modules, programs and/or instructions stored in memory 704 and thereby perform processing operations.

In some embodiments, the memory 704 stores one or more programs (e.g., sets of instructions) and/or data structures, collectively referred to as "modules" herein. In some embodiments, memory 704, or the non-transitory computer readable storage medium of memory 704, stores the following programs, modules, and data structures, or a subset or superset thereof:

operating system 710;

link evaluation module 715, which implements the link evaluation module 115 and tracks link performance metrics;

optional path computation module 730, which implements the path computation module 130 and computes one or more paths for delivering requested video content; and dynamic segmentation module 760, which includes, for example:

network analysis submodule 762, which analyzes the link performance metrics to determine a segmentation profile for the requested video content;

segment files submodule 764, which selects (or generates), and loads into memory 704 one or more sets of segments (e.g., segment-1 766-1 through segment-n 766-n) of the requested video content for delivery to one or more clients; and manifest file generation module 768, which generates one or more manifest files for the video content.

The above identified modules (e.g., data structures, and/or programs including sets of instructions) need not be implemented as separate software programs, procedures, or modules, and thus various subsets of these modules may be combined or otherwise re-arranged in various embodiments. In some embodiments, memory 704 stores a subset of the modules identified above. In some embodiments, a database 744 (e.g., a local database and/or a remote database) stores one or more modules identified above and data associated with the modules. Furthermore, the memory 704 may store additional modules not described above. In some embodiments, the modules stored in memory 704, or a non-transitory computer readable storage medium of memory 704, provide instructions for implementing respective operations in the methods described below. In some embodiments, some or all of these modules may be implemented with specialized hardware circuits that subsume part or all of the module functionality. One or more of the above identified elements may be executed by one or more of processor(s) 702.

I/O subsystem 708 communicatively couples server 700 to one or more devices such as website servers (e.g., 750, 752) and/or one or more user devices (e.g., 746, 748) via a local and/or wide area communications network 742 (e.g., the Internet) via a wired and/or wireless connection. User device 746 can request the video content via an application 747.

Communication bus 740 optionally includes circuitry (sometimes called a chipset) that interconnects and controls communications between system components.

Figure 8:
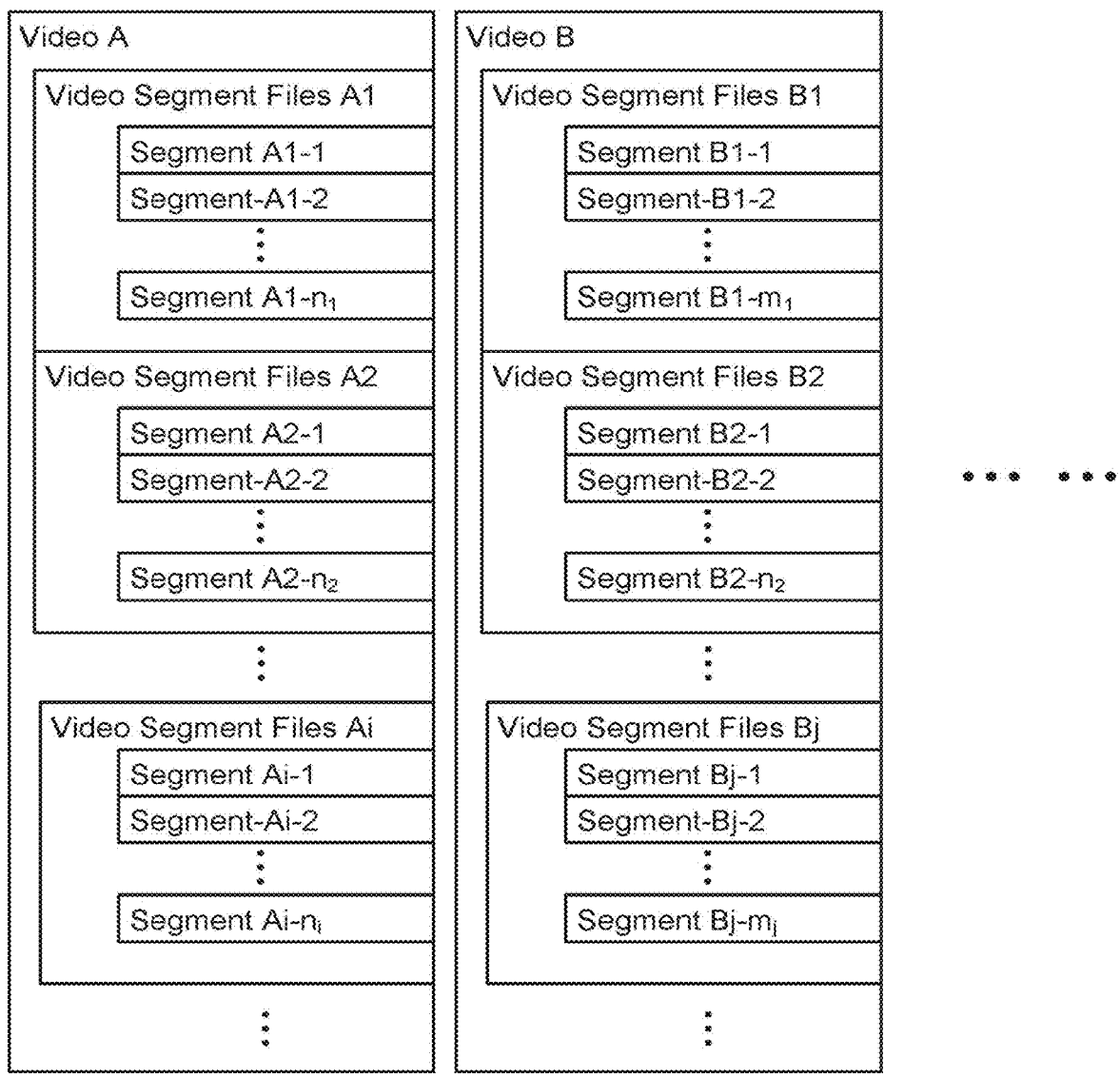
FIG. 8 is a block diagram illustrating video files associated with video content for delivery over mesh network according to some embodiments.

FIG. 8 is a block diagram illustrating video files 800 associated with video content (e.g., video A, video B, . . . ) for delivery over mesh network 100, according to certain embodiments. The video files 800 are stored in database 744. As generally known, video data files may be several gigabytes or more in size. In order to facilitate the transfer of a video data file to client devices 746, 748 for playback, it is desirable to divide the video data file into smaller segments. As shown in FIG. 8, a video data file is segmented into small segment files for transmission over network 100. For example, Video file A can be segmented into a first set (e.g., set A1) of segment files (e.g., Segment A1-1, A1-2, ..., A1-$n_1$), each having a first segment size SS1 (e.g., a file size corresponding to a playback duration of 4 sec) and being assigned a file name and a location in database 744. In certain embodiments, to facilitate fast response time with dynamic segmentation, video file A may also be segmented into one or more additional sets (e.g., sets A2, ..., Ai, ...) of segment files (e.g., Segment A2-1, A2-2, ..., A2-$n_2$, and Segment Ai-1, Ai-2, ..., Ai-$n_i$), each being assigned a file name and a location in database 744. Each segment file in set A2 has a second segment size SS2 (e.g., a file size corresponding to a playback duration of 2 sec) that is different from SS1, and each segment file in set Ai has a third segment size SSi (e.g., a file size corresponding to a playback duration of 0.5 sec) that is different from SS1 and SS2. Similar or different segmentation schemes can be done for Video file B, as shown in FIG. 8.

In some embodiments, server 700 is configured to receive, from a first application (e.g., application 747) executing on a first client device (e.g., client 746), a first request to provide first video content (e.g., video file A) for playback. A user at the first client device can request playback of the first video content by clicking an HTTP link in the first application, which causes the first client device to request a first manifest file, whose URL is typically embedded in the HTTP link. In general, a manifest file for a video content is a file that includes URIs (e.g., URLs) to identify the locations of the segment files for the video content. Once the manifest file is received, the client requests appropriate segments (based on the playback location in the video sequence) of the video content in a sequence as the playout progresses.

Figure 9:
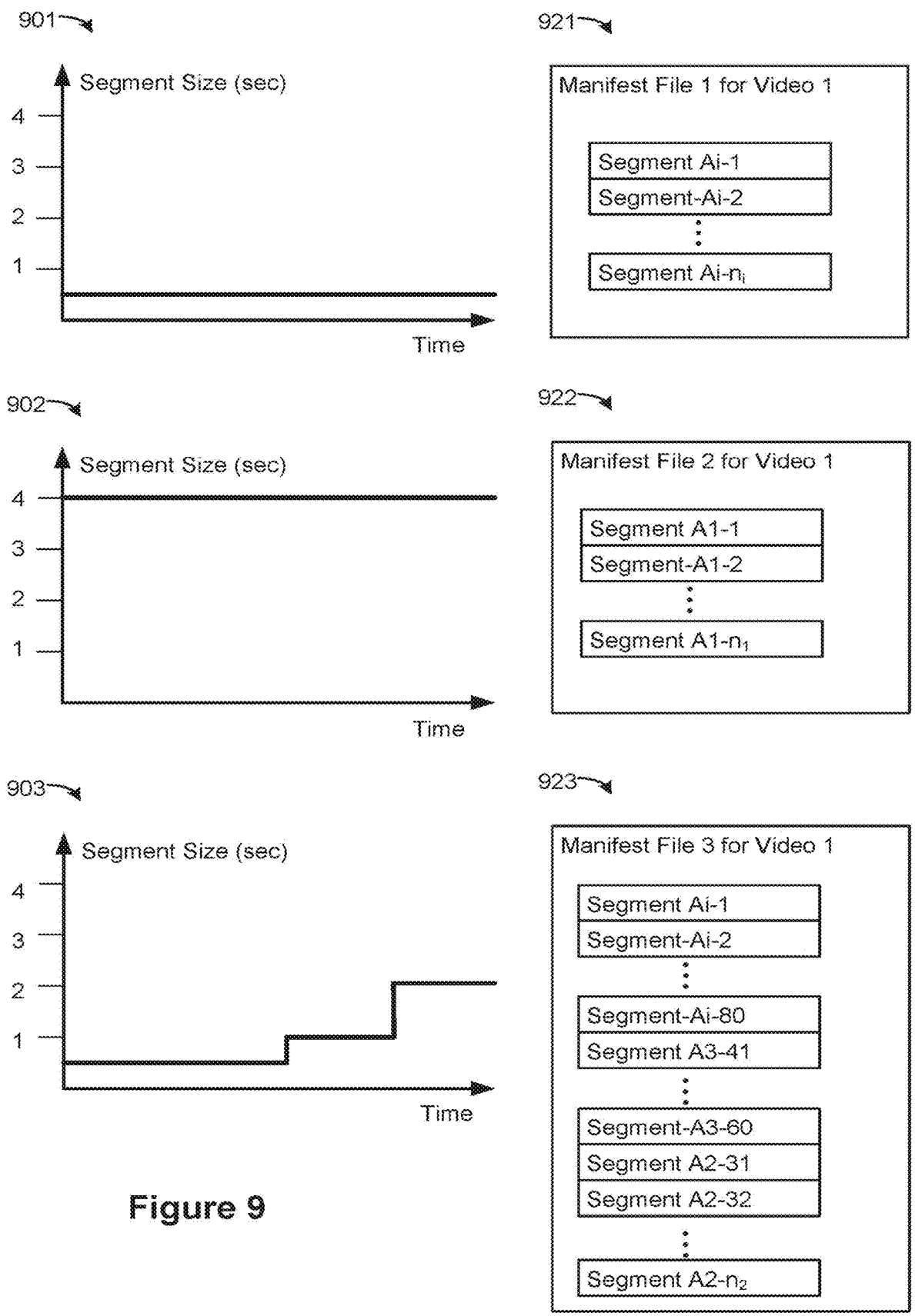
FIG. 9 includes timing diagrams and block diagrams illustrating a few exemplary segmentation profiles (segment size vs. playback time) and associated manifest files according to some embodiments.

Processor(s) 702, when executing the dynamic segmentation module 760, is configured to retrieve first link performance metrics of first network links for providing the first video content to the first client device. Based on the first link performance metrics, processor(s) 702 then determines a first segmentation profile for segmenting the first video content into a first plurality of video segments. FIG. 9 illustrates a few exemplary segmentation profiles (segment size vs. playback time) and associated manifest files. For example, if first link performance metrics indicate persistent overall low bandwidth or large latency in first network links, the first video content (e.g., video A) may be segmented according to segmentation profile 901, whereby the first plurality of video segments each has a small segment size (e.g., a file size corresponding to a playback duration of 0.5 sec). So, throughout the playback time, the first client device will be requesting and receiving 0.5 sec segments according to the corresponding manifest file (e.g., manifest file 921, which lists in a temporal order the segment files Ai-1, Ai-2, ..., Ai-ni in set Ai.

As another example, if first link performance metrics indicate persistent overall high bandwidth or low latency in first network links, the first video content (e.g., video A) may be segmented according to segmentation profile 902, whereby the first plurality of video segments each has a maximum segment size (e.g., a file size corresponding to a playback duration of 4 sec). So, throughout the playback time, the first client device will be requesting and receiving 4 sec segments according to the corresponding manifest file (e.g., manifest file 922, which lists in a temporal order the segment files A1-1, A1-2, ..., A1-$n_1$ in set A1.

As another example, if first link performance metrics indicate moderate overall bandwidth or latency with transient low bandwidth periods in first network links, the first video content (e.g., video A) may be segmented according to segmentation profile 903, whereby the first plurality of video segments may start with a small segment size (e.g., a file size corresponding to a playback duration of 0.5 sec) and ramp up to a relatively larger segment size (e.g., a file size corresponding to a playback duration of 2 sec). So, the first client device will be requesting and receiving 0.5 sec segments in the first section (e.g., first 40 sec) of the playback time, 1 sec segments in the second section (e.g., first 20 sec after the first 40 sec) of the playback time, and 4 sec segments afterwards, according to the corresponding manifest file (e.g., manifest file 923, which lists in a temporal order the segment files Ai-1, Ai-2, ..., Ai-80 in set Ai, followed by A3-41, A3-42, ..., A3-60 in set A3, and followed by A3-31, A3-32, ..., A3-$n_2$.

Thus, the first plurality of content video segments include first content video segments each having a first segment size (e.g., 0.5 sec, 4 sec, 1 sec, or 2 sec) and may include other segments having a segment size different from the first segment size.

In certain embodiments, processor(s) 702, when executing the dynamic segmentation module 760, is further configured generate a first manifest file referencing the first plurality of content video segments in a first temporal order (e.g., manifest file 921, 922, or 923), and provide the first manifest file to the first application in response to the first request. The first manifest file enables the first application to obtain and playback at least part of the first video content.

In some embodiments, processor(s) 702 is further configured to receive, from a second application executing on a second client device (e.g., client device 748), a second request to provide the first video content for playback, to retrieve second link performance metrics of second network links for providing the first video content to the second client device, and to determine a second segmentation profile for segmenting the first video content into a second plurality of video segments based on the second link performance metrics. Since the second link performance metrics can be different from the first link performance metrics, the second plurality of video segments can include second video segments each having a second segment size that is distinct from the first segment size. Processor(s) 702 is further configured to generate a second manifest file referencing the second plurality of video segments in a second temporal order; and to provide the second manifest file to the second application in response to the second request, the second manifest file enabling the second application to obtain and playback at least part of the first video content.

In some embodiments, processor(s) 702 is further configured to receive, from the first application executing on the first client device, a third request to provide a second video content for playback, to retrieve third link performance metrics of third network links for providing the second video content to the first client device, and to determine a third segmentation profile for segmenting the second video into a third plurality of video segments based on the third link performance metrics. Since the third request may be placed at a different time from the first request, the third link performance metrics may show improvement or degradation of network conditions after the first request, so that the third plurality of video segments may include third video segments each having a third segment size that is distinct from the first segment size. Processor(s) 702 is further configured to generate a third manifest file referencing the third plurality of video segments in a third temporal order, and to provide the third manifest file to the first application in response to the third request, the third manifest file enabling the first application to obtain and playback at least part of the second video content.

In some embodiments, processor(s) 702 is further configured to, for each respective video segment in the first plurality of video segments, determine a respective segment size of the each respective video segment based on the first link performance metrics, determine if a respective segment file corresponding to the each respective video segment is present in one or more storage devices accessible by the server, and generate the respective segment file in response to the determination that the respective segment file is not present in the one or more storage devices.

In some embodiments, processor(s) 702 is further configured to determine a network path from the server to client. And determine the first links based in the network path.

In some embodiments, at least one of the link performance metrics is determined by the first client device and received by the server.

Figure 10A:
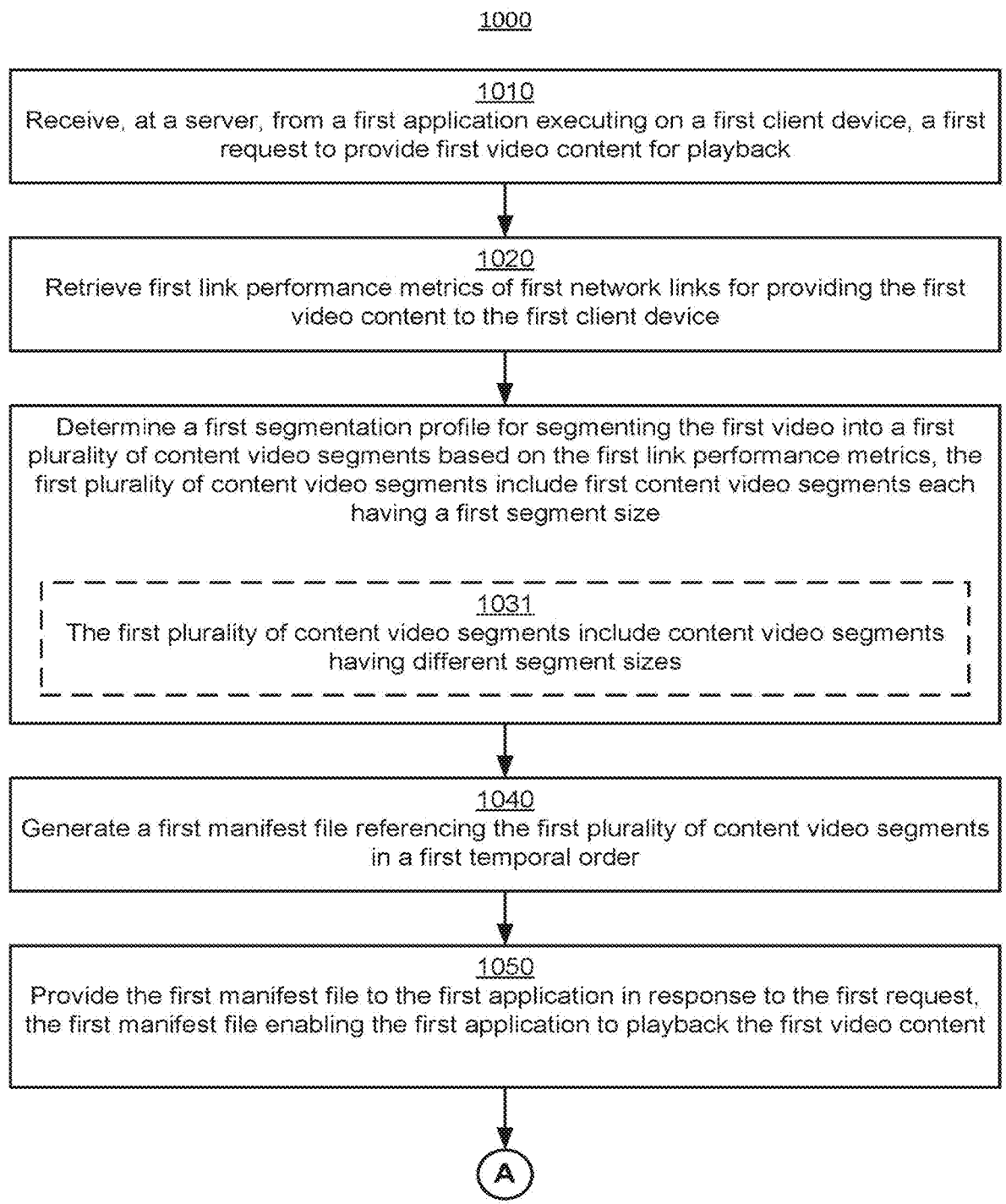
FIGS. 10A-10C are flowcharts illustrating a method for providing video content for playback by client devices according to some embodiments.
Figure 10B:
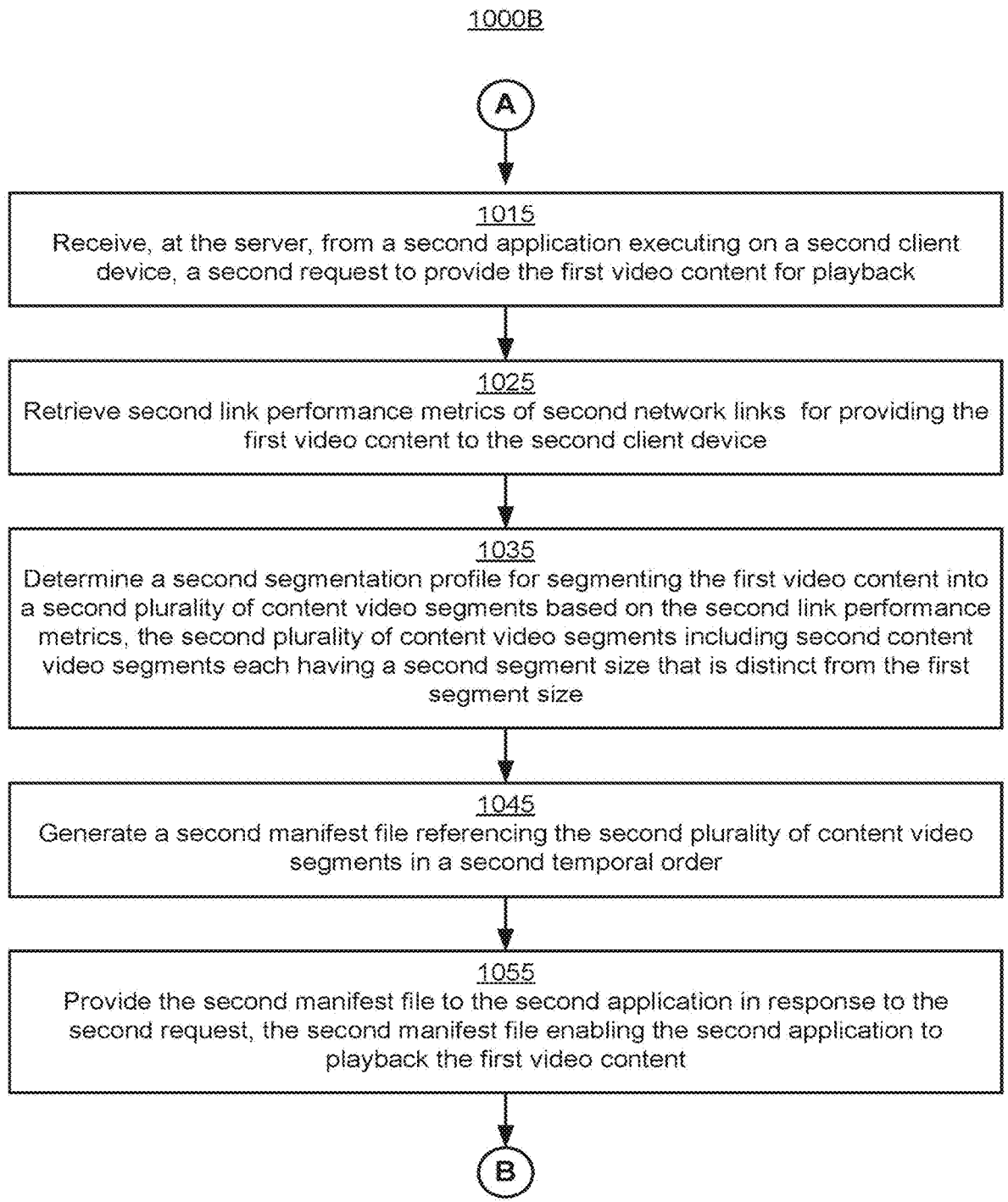
Figure 10C:
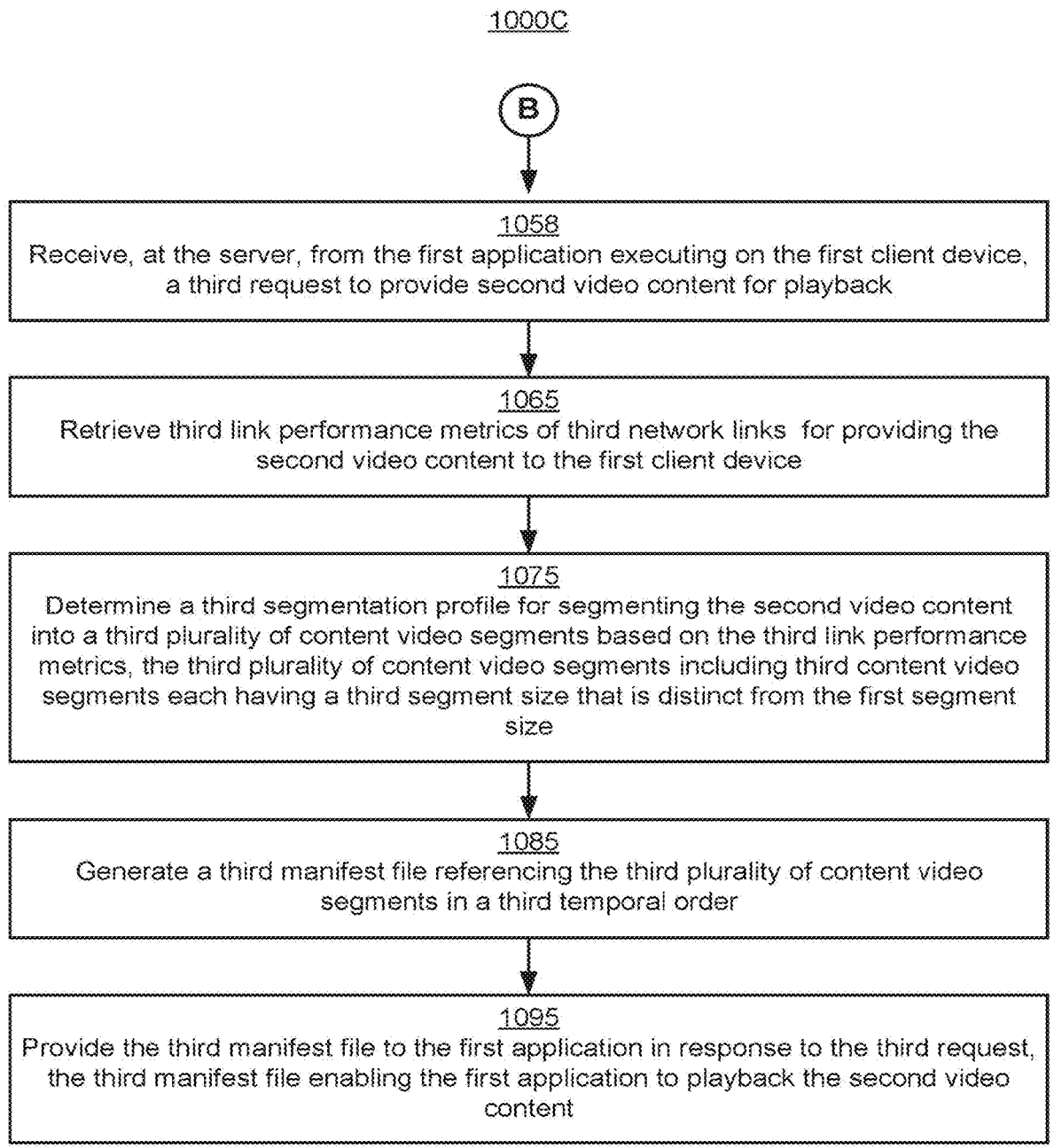

FIGS. 10A-10C illustrate a method 1000 for providing video content for playback by client devices. As shown in FIG. 10A, the method 1000 comprises: at a server in a content delivery network, receiving (1010), from a first application executing on a first client device, a first request to provide first video content for playback; retrieving (1020) first link performance metrics of first network links for providing the first video content to the first client device; determining (1030) a first segmentation profile for segmenting the first video into a first plurality of video segments based on the first link performance metrics, the first plurality of video segments including (1031) first video segments each having a first segment size; generating (1040) a first manifest file referencing the first plurality of video segments in a first temporal order; and providing (1050) the first manifest file to the first application in response to the first request, and the first manifest file enabling the first application to obtain and playback at least part of the first video content.

In some embodiments, as shown in FIG. 10B, the method 1000 further comprises: receiving (1015), from a second application executing on a second client device, a second request to provide the first video content for playback; retrieving (1025) second link performance metrics of second network links for providing the first video content to the second client device; determining (1035) a second segmentation profile for segmenting the first video into a second plurality of video segments based on the second link performance metrics, the second plurality of video segments including second video segments each having a second segment size that is distinct from the first segment size; generating (1045) a second manifest file referencing the second plurality of video segments in a second temporal order; and providing (1055) the second manifest file to the second application in response to the second request, the second manifest file enabling the second application to obtain and playback at least part of the first video content.

In some embodiments, as shown in FIG. 10C, the method 1000 further comprises: receiving (1058), from the first application executing on the first client device, a third request to provide a second video content for playback; retrieving (1065) third link performance metrics of third network links for providing the second video content to the first client device; determining (1075) a third segmentation profile for segmenting the second video into a third plurality of video segments based on the third link performance metrics, the third plurality of video segments include third video segments each having a third segment size that is distinct from the first segment size; generating (1085) a third manifest file referencing the third plurality of video segments in a third temporal order; and providing (1095) the third manifest file to the first application in response to the third request, the third manifest file enabling the first application to obtain and playback at least part of the second video content.

In some embodiments, the method further comprises, for each respective video segment in the first plurality of video segments, determining a respective segment size of the each respective video segment based on the first link performance metrics; determining if a respective segment file corresponding to the each respective video segment is present in one or more storage devices accessible by the server; and generating the respective segment file in response to the determination that the respective segment file is not present in the one or more storage devices.

In some embodiments, the method further comprises: determining a network path from the server to client; and determining the first links based on the network path.

In some embodiments, at least one of the link performance metrics is determined by the first client device, and the method further comprises receiving the at least one of the link performance metrics from the first client device.

In some embodiments, the first manifest file includes a respective network location for the respective segment file corresponding to the each respective video segment in the first plurality of video segments. In some embodiments, the first manifest file includes the respective segment size.

In some embodiments, the first plurality of video segments further include fourth video segments each having a fourth segment size that is distinct from the first segment size. The fourth video segments are to be played back by the client device subsequent to the first video segments, and the fourth segment size is larger than the first segment size.

In some embodiments, the first segment size corresponds to a first playback duration and the second segment size corresponds to a second playback duration that is distinct from the first playback duration.

In some embodiments, the first segment size corresponds to a first image resolution and the second segment size corresponds to a second image resolution that is distinct from the first image resolution.

In some embodiments, the first link performance metrics include one or more of
bytes transmitted per second and per connection through each node in the first links;
bytes received per second and per connection by the each node;
requests per second per connection in the first links;
incoming packet loss per network address in the first links;
outgoing packet loss per network address in the first links;
latency per network address in the first links;
bandwidth per network address in the first links;
jitter per network address in the first links; and
network utilization in the first links.

In some embodiments, the first link performance metrics are based on historical signals provided by the first client device based on past interactions with the server—e.g., request cadence, re-transmission requests; or performance information collected by the server (i.e., z-node or similar) based on its past network interactions (round trip time, bandwidth, packet-loss) with the client device. Round trip time (or RTT) is a key signal. It can be determined by a node or by a client that has been programmed to determine RTT.

It will be apparent from this description that aspects of the inventions may be embodied, at least in part, in software. That is, link evaluation module 115, DNS module 120, forwarding module 125, path computation module 130, dynamic segmentation module 160, and/or computer-implemented method 200 may be implemented or otherwise carried out in a computer system or other data processing system, such as one or more respective nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a node 105. It will also be appreciated that additional components, not shown, may also be part of nodes 105, and, in certain embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory computer-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

The invention claimed is:

1. A method comprising:
    tracking performance metrics at least with respect to a first node in a network;
    for each of a plurality of requests from a client for content from an application, determining values of the performance metrics based on the tracking;
        determining a segmentation profile based on context of the application and the values of the tracked performance metrics, wherein context of the application corresponds to one or more of the performance metrics indicated for the application or a service associated with the application;
        segmenting a file corresponding to the request into chunks according to the segmentation profile and generating a manifest indicating the chunks; and
        transmitting the manifest to the client.

2. The method of claim 1, wherein transmitting the manifest to the client is according to context-aware next hop information which is periodically received.

3. The method of claim 2, further comprising:
    selecting a next hop from the context-aware next hop information,
        wherein the context-aware next hop information indicates a service identifier mapped to one or more hops determined from one or more paths through a network and the service identifier corresponds to the application or service,
        wherein the one or more paths were computed based on the context of the application or service and values of the one or more performance metrics of the context tracked prior to receipt of the context-aware next hop information,
        wherein the manifest is transmitted to the selected next hop.

4. The method of claim 3 further comprising periodically transmitting values of the tracked performance metrics for computation of the paths.

5. The method of claim 3 further comprising:
    for each application delivered from the network, periodically computing a set of one or more optimal paths for high performance delivery of the application based on current values of performance metrics tracked across multiple nodes of the network including the first node, wherein periodically computing the set of optimal paths comprises,
        computing potential paths through the network for delivering the application; and selecting from the potential paths the set of optimal paths based on context of the application.

6. The method of claim 2 further comprising ranking next hops indicated in the context-aware next hop information based on values of the tracked performance metrics relevant to the context of the application.

7. The method of claim 1, wherein the performance metrics comprise at least two of data flow characteristics, requests per second per connection, incoming packet loss per network address, outgoing packet loss per network address, latency per network address, bandwidth per network address, jitter per network address, network utilization, traffic content, latency of requests and/or responses.

8. The method of claim 7, wherein tracking traffic content comprises inspecting data and/or metadata in transit and wherein the latency of requests and/or responses comprises latency of requests and/or responses of hypertext markup language pages, JavaScript, cascading style sheets, images, application programming interfaces, and/or media.

9. The method of claim 1 further comprising determining the context for the application or service based, at least in part, on detected type of traffic.

10. A non-transitory, machine-readable medium having program code stored thereon, the program code comprising instructions to:
   track performance metrics at least with respect to a first node in a network;
   for each of a plurality of requests from a client for content from an application, determine values of the performance metrics based on the tracking;
      determine a segmentation profile based on context of the application and the values of the tracked performance metrics, wherein context of the application corresponds to one or more of the performance metrics indicated for the application or a service associated with the application;
      segment a file corresponding to the request into chunks according to the segmentation profile and generate a manifest indicating the chunks; and
      transmit the manifest to the client.

11. The machine-readable medium of claim 10, wherein the instructions to transmit the manifest to the client comprise the instructions to transmit the manifest according to context-aware next hop information which is periodically received.

12. The machine-readable medium of claim 11, wherein the program code further comprises instructions to:
   select a next hop from the context-aware next hop information,
   wherein the context-aware next hop information indicates a service identifier mapped to one or more hops determined from one or more paths through a network and the service identifier corresponds to the application or service,
   wherein the one or more paths were computed based on the context of the application or service and values of the one or more performance metrics of the context tracked prior to receipt of the context-aware next hop information,
   wherein the manifest is transmitted to the selected next hop.

13. The machine-readable medium of claim 11, wherein the program code further comprises instructions to rank next hops indicated in the context-aware next hop information based on values of the tracked performance metrics relevant to the context of the application.

14. The machine-readable medium of claim 13, wherein the program code further comprises instructions to:
   for each application delivered from the network, periodically compute a set of one or more optimal paths for high performance delivery of the application based on current values of performance metrics tracked across multiple nodes of the network including the first node, wherein the instructions to periodically compute the set of optimal paths comprise instructions to,
      compute potential paths through the network for delivering the application; and
      select from the potential paths the set of optimal paths based on context of the application.

15. The machine-readable medium of claim 10, wherein the performance metrics comprise at least two of data flow characteristics, requests per second per connection, incoming packet loss per network address, outgoing packet loss per network address, latency per network address, bandwidth per network address, jitter per network address, network utilization, traffic content, latency of requests and/or responses.

16. The machine-readable medium of claim 10, wherein the program code further comprises instructions to determine the context for the application or service based, at least in part, on detected type of traffic.

17. An apparatus comprising:
   a processor,
   a network interface; and
   a non-transitory machine-readable medium having instructions stored thereon that are executable by the processor to cause the apparatus to,
   track performance metrics at least with respect to the apparatus;
   for each of a plurality of requests from a client for content from an application, determine values of the performance metrics based on the tracking;
      determine a segmentation profile based on context of the application and the values of the tracked performance metrics, wherein context of the application corresponds to one or more of the performance metrics indicated for the application or a service associated with the application;
      segment a file corresponding to the request into chunks according to the segmentation profile and generate a manifest indicating the chunks; and
      transmit, via the network interface, the manifest to the client.

18. The apparatus of claim 17, wherein the machine-readable medium further has stored thereon instructions executable by the processor to cause the apparatus to:
   select a next hop from context-aware next hop information that is periodically received by the apparatus,
   wherein the context-aware next hop information indicates a service identifier mapped to one or more hops determined from one or more paths through a content delivery network and the service identifier corresponds to the application or service,
   wherein the one or more paths were computed based on the context of the application or service and values of the one or more performance metrics corresponding to the context tracked prior to receipt of the context-aware next hop information,
   wherein the manifest is transmitted to the selected next hop.

19. The apparatus of claim 17, wherein context indicates sensitivity to one of the performance metrics or a combination of the performance metrics and wherein the performance metrics comprise at least two of data flow characteristics, requests per second per connection, incoming packet loss per network address, outgoing packet loss per network address, latency per network address, bandwidth per network address, jitter per network address, network utilization, traffic content, latency of requests and/or responses.

20. The apparatus of claim 17, wherein the machine-readable medium further has stored thereon instructions executable by the processor to cause the apparatus to determine the context for the application or service based, at least in part, on detected type of traffic.

\* \* \* \* \*